United States Patent
Kowada et al.

(10) Patent No.: US 8,948,931 B2
(45) Date of Patent: Feb. 3, 2015

(54) CONTROL SYSTEM FOR VEHICLE (75) Inventors: Masahiro Kowada, Wako (JP); Shinichi Arie, Wako (JP); Junpei Noguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/351,907

(22) PCT Filed: Jul. 17, 2012

(86) PCT No.: PCT/JP2012/068091
§ 371 (c)(1),
(2), (4) Date: Apr. 15, 2014

(87) PCT Pub. No.: WO2013/057989
PCT Pub. Date: Apr. 25, 2013

(65) Prior Publication Data
US 2014/0244074 A1    Aug. 28, 2014

(30) Foreign Application Priority Data

Oct. 20, 2011    (JP) ................... 2011-230768

(51) Int. Cl.
| G06F 17/00 | (2006.01) |
| B60R 16/03 | (2006.01) |
| G08B 25/01 | (2006.01) |
| G08B 23/00 | (2006.01) |
| G08B 1/00 | (2006.01) |
| G08B 25/00 | (2006.01) |
| G08B 21/00 | (2006.01) |
| B60Q 1/00 | (2006.01) |

(52) U.S. Cl.
CPC .............. *B60R 16/03* (2013.01); *G08B 25/016* (2013.01); *G08B 23/00* (2013.01); *G08B 1/00* (2013.01); *G08B 25/001* (2013.01); *G08B 21/00* (2013.01); *B60Q 1/00* (2013.01)
USPC .................. 701/2; 701/48; 701/51; 340/438; 340/540; 340/693.1

(58) Field of Classification Search
CPC ..... B60R 16/02; G08B 25/001; B08B 25/016
USPC ................ 701/2, 48, 51; 340/438, 540, 693.1
See application file for complete search history.

(56) References Cited

U.S. PATENT DOCUMENTS 8,219,289 B2 *  7/2012  Kamada et al. .................. 701/51
8,412,422 B2 *  4/2013  Kamada et al. .................. 701/51

(Continued)

FOREIGN PATENT DOCUMENTS

| JP | 08-023641 | 1/1996 |
| JP | 2007-210473 | 8/2007 |
| WO | 03/086820 | 10/2003 |

*Primary Examiner* — McDieunel Marc
(74) *Attorney, Agent, or Firm* — Rankin, Hill & Clark LLP (57) ABSTRACT

A control system for a vehicle, capable of suppressing increase in power consumption and reducing running cost when electric power supplied from power source is consumed by an on-vehicle electric device. The control system 1 for a vehicle V includes an ECU 2. If a predetermined communication state where a portable device 11 is estimated to be in a compartment of the vehicle V is established (if the answer to the question of the step 23 is NO) after a state where a power source position set by a changeover switch 22 is an accessory position has continued for a first predetermined time period (ΔT·TREF), the ECU 2 stops power supply from the power source to the on-vehicle electric device when a second predetermined time period (ΔT·TREF) elapses after the predetermined communication state was established (steps 26, 11, 13).

3 Claims, 4 Drawing Sheets

(56) References Cited

U.S. PATENT DOCUMENTS

| | | | |
|---|---|---|---|
| 8,754,607 B2* | 6/2014 | Shimamura | 320/104 |
| 2009/0043465 A1* | 2/2009 | Tomita | 701/51 |
| 2009/0326767 A1* | 12/2009 | Kamada et al. | 701/48 |
| 2010/0225462 A1* | 9/2010 | Ito et al. | 340/438 |
| 2014/0103872 A1* | 4/2014 | Ichikawa | 320/108 |

* cited by examiner

CONTROL SYSTEM FOR VEHICLE

FIELD OF THE INVENTION

The present invention relates to a control system for a vehicle, for controlling a state of power supply from a power source to on-vehicle electric equipment according to a switched state of a power source position by a driver, and more particularly to a control system for controlling a state of power supply to on-vehicle electrical equipment according to e.g. whether or not a predetermined state of communication with a portable device is established.

BACKGROUND ART

Conventionally, as a control system for a vehicle, one disclosed in Patent Literature 1 is known. This vehicle includes a battery as a power source, a car audio device to which electric power is supplied from the battery, an ignition switch for starting an engine, and so forth. In this control system, when a power source position of the ignition switch is switched from an ignition position to an accessory position by a driver, an output of the car audio device is controlled such that it is reduced by a predetermined level so as to suppress reduction of the remaining charge capacity of the battery.

CITATION LIST

[Patent Literature 1]
[PTL 1] Japanese Laid-Open Patent Publication No. H08-23641

SUMMARY OF INVENTION

Technical Problem

According to the above-described conventional control system for a vehicle, when the power source position of the ignition switch is switched from the ignition position to the accessory position, although the output of the car audio device is controlled such that it is reduced by a predetermined level, if this state continues for a long time, the amount of power consumption continuously increases with time, and eventually, the battery runs out. This causes overdischarge of the battery, whereby the battery life may become short.

The present invention has been made to provide a solution to the above-described problem, and an object thereof is to provide a control system for a vehicle, which is capable of suppressing increase in power consumption in a case where electric power supplied from a power source is consumed by on-vehicle electric equipment, and reducing the running cost.

Solution to Problem

To attain the above object, the invention according to claim 1 provides a control system 1 for a vehicle V that has a motive power source (internal combustion engine 3) mounted thereon and has the motive power source enabled by wireless communication between a portable device 11 and an on-vehicle communication device 10 to operate, the control system controlling a state of power supply from a power source (battery 4) to the motive power source and an on-vehicle electric device (car navigation system 5) according to the switching of a power source position of a power source position-switching device (changeover switch 22) by an occupant, comprising power source position-detecting means (changeover switch 22) for detecting the power source position, and control means (ECU 2, steps 1 to 13) for controlling electric power from the power source such that the electric power is supplied to the on-vehicle electric device, when the detected power source position is in an accessory position in which the electric power from the power source is to be supplied to the on-vehicle electric device, wherein in a case where a predetermined communication state between the on-vehicle communication device 10 and the portable device 11 is established in which the portable device 11 is estimated to be in a compartment of the vehicle V (if the answer to the question of the step 23 is negative (NO)) after a state in which the power source position is in the accessory position has continued for a first predetermined time period (time period corresponding to a value of $\Delta T \cdot TREF$) (after the answer to the question of the step 8 becomes affirmative (YES)), the control means stops power supply from the power source to the on-vehicle electric device when a second predetermined time period (time period corresponding to $\Delta T \cdot TREF$) elapses after a time at which the predetermined communication state is established (if the answer to the question of the step 20 is affirmative (YES)) (steps 26, 11, 13).

According to this control system for a vehicle, the state of power supply from the power source to the motive power source and the on-vehicle electric device is controlled according to the switching of the power source position of the power source position-switching device by an occupant, and electric power from the power source is controlled such that it is supplied to the on-vehicle electric device when the power source position is in the accessory position in which the electric power from the power source is to be supplied to the on-vehicle electric device. In doing this, in a case where the predetermined communication state between the on-vehicle communication device and the portable device after the state is established in which the portable device is estimated to be in the compartment of the vehicle after the state in which the power source position is in the accessory position has continued for the first predetermined time period, the power supply from the power source to the on-vehicle electric device is stopped when the second predetermined time period elapses after the predetermined communication state has been established. As described above, even after the state in which the power source position is in the accessory position has continued for the first predetermined time period, in the case where the occupant carrying the portable device is estimated to be in the compartment of the vehicle, the power supply from the power source to the on-vehicle electric device is continued until the second predetermined time period elapses after the predetermined communication state has been established, and hence the on-vehicle electric device can be used during a time period over which the power supply is continued, which improves the convenience of the occupant. In addition to this, the power supply from the power source to the on-vehicle electric device is stopped when the second predetermined time period elapses after the predetermined communication state has been established, and hence it is possible to suppress increase in power consumption and reduce the running cost. For the same reason, in a case where a storage battery is used as the power source, it is possible to prevent the storage battery from being overdischarged, which makes it possible to prolong the life of the storage battery.

The invention according to claim 2 is the control system 1 for the vehicle V according to claim 1, further comprising door opened/closed state-detecting means (door sensor 20) for detecting an opened/closed state of doors of the vehicle V, and based on a detection result from the door opened/closed state-detecting means, in a case where a condition that the predetermined communication state is not established and also the doors are in the opened state is satisfied (if the answer to the question of the step 24 is negative (NO)) after the state in which the power source position is in the accessory position has continued for the first predetermined time period, the control means stops the power supply from the power source to the on-vehicle electric device, when a third predetermined time period (time period corresponding to ΔT·TREF) elapses after a time at which the condition is satisfied (steps 26, 11, 13).

According to this control system for a vehicle, when the condition that the predetermined communication state is not established and also the doors are in the opened state is satisfied after the state in which the power source position is in the accessory position has continued for the first predetermined time period, i.e. when the condition is satisfied that although the portable device is estimated not to be in a compartment of the vehicle, the occupant is estimated to be near the vehicle because the doors are in the opened state, power supply from the power source to the on-vehicle electric device is continued until the third predetermined time period elapses after the condition has been satisfied. This makes it possible to further improve the convenience of the occupant. In addition to this, the power supply from the power source to the on-vehicle electric device is stopped when the third predetermined time period elapses after the condition has been satisfied. This makes it possible to further suppress increase in power consumption and further reduce the running cost.

The invention according to claim 3 is the control system 1 for the vehicle V according to claim 2, further comprising shift position-detecting means (shift position sensor 21) for detecting a shift position of an automatic transmission 6 of the vehicle V, and based on detection results from the shift position-detecting means and the door opened/closed state-detecting means, in a case where the predetermined communication state is not established and also the doors are in the closed state (if the answers to the question of the steps 23 and 24 are affirmative (YES)) after the state in which the power source position is in the accessory position has continued for the first predetermined time period, the control means continues, when the shift position is in a position other than a parking position (if the answer to the question of the step 25 is negative (NO)), the power supply from the power source to the on-vehicle electric device (steps 28, 11, 12).

According to this control system for a vehicle, in a case where the predetermined communication state is not established and the doors are in the closed state after the state in which the power source position is in the accessory position has continued for the first predetermined time period, when the shift position is in a position other than the parking position, the power supply from the power source to the on-vehicle electric device is continued. That is, in the case where although there is a possibility that the occupant carrying the portable device is in the compartment of the vehicle because the portable device is not in the compartment of the vehicle and also the doors are in the closed state, there is a possibility that the occupant not carrying the portable device is in the compartment of the vehicle because the shift position is in a position other than the parking position, the power supply from the power source to the on-vehicle electric device is continued. Therefore, when the occupant not carrying the portable device attempts to go out of the vehicle, if the shift position is in a position other than the parking position, it is possible to continuously generate an alarm so as to notify the occupant of the fact, which makes it possible to improve marketability.

MODE FOR CARRYING OUT INVENTION

Figure 1:
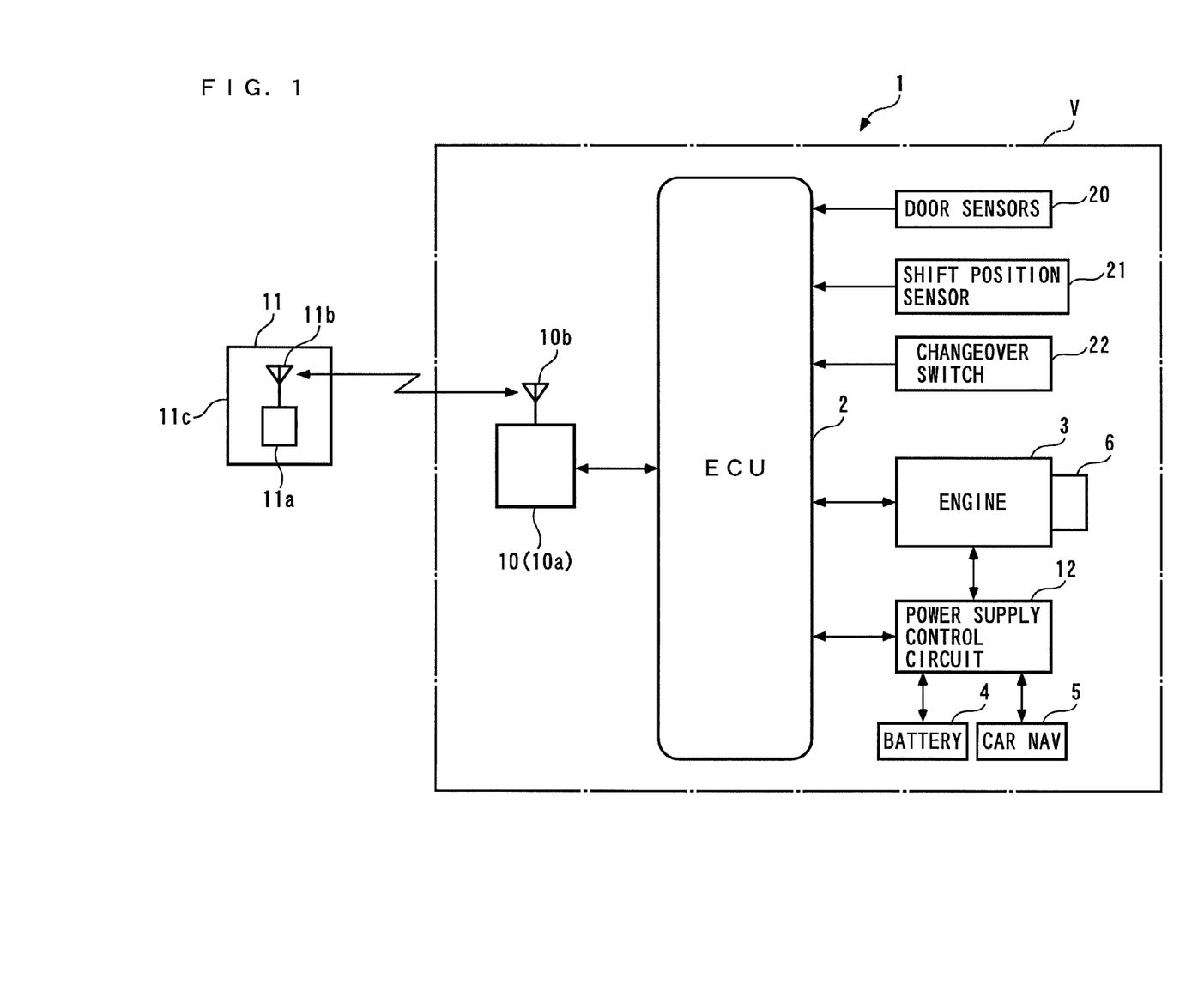
FIG. 1 A schematic view of a control system for a vehicle according to an embodiment of the present invention.

A control system for a vehicle according to an embodiment of the present invention will now be described with reference to the drawings. As shown in FIG. 1, the control system 1 according to the present embodiment includes an ECU 2 and an on-vehicle communication device 10, which are mounted on a vehicle V, a portable device 11 which can be carried separately from the vehicle V, a power supply control circuit 12, and so forth. The ECU 2 executes various control processes, such as an ACC-time power control process, as described hereinafter.

This vehicle V includes an internal combustion engine (hereinafter referred to as the "engine") 3 as a motive power source, a battery 4 of a lead acid battery type as a power source, a car navigation system (hereinafter referred to as "the car nav") 5 as an on-vehicle electric device, and so forth, and the battery 4 and the car nav 5 are both electrically connected to the power supply control circuit 12. The power supply control circuit 12 is formed by an electric circuit, and changes electric power supplied from the battery 4 to the car nav 5 according to a control input signal from the ECU 2. The ECU 2 controls a state of power supply from the battery 4 to the car nav 5, based on a power source position, described hereinafter, via the power supply control circuit 12.

Further, the engine 3 includes fuel injection valves and spark plugs (none of which are shown), which are electrically connected to the ECU 2 via the power supply control circuit 12. The ECU 2 controls electric power to be supplied from the battery 4 to the fuel injection valves and the spark plugs via the power supply control circuit 12 to thereby control the operating state of the engine 3.

Further, the vehicle V includes five doors including a tail gate (none of which are shown) and an automatic lock mechanism (not shown) for executing operations for locking and unlocking these doors. Door sensors 20 (only one of which is shown) are provided near parts where the doors are attached to the vehicle body. Each door sensor 20 detects an opened or closed state of an associated one of the doors, and outputs a detection signal indicative of the detected opened or closed state to the ECU 2. The ECU 2 determines the opened or closed state of each door based on the detection signal from each door sensor 20.

Further, the above-mentioned on-vehicle communication device 10 is configured to execute transmission and reception of a radio signal to and from the portable device 11, and includes a communication control circuit 10a electrically connected to the ECU 2 and an antenna 10b for transmitting and receiving a radio signal to and from the portable device 11. The communication control circuit 10a is formed by an electric circuit.

In this on-vehicle communication device 10, when a control input signal is input from the ECU 2 to the communication control circuit 10a, a command signal corresponding to the control input signal is sent to the portable device 11 via the antenna 10b. For example, as described hereinafter, when a control input signal for checking whether or not the portable device 11 exists in a compartment of the vehicle V (hereinafter referred to as "in the vehicle compartment") is input from the ECU 2, a command signal in the LF band for confirming the existence of the portable device 11 (hereinafter referred to as the "confirmation signal") is sent to the portable device 11. This confirmation signal is sent as a radio signal of a wave strength which can be received by the portable device 11 only when the portable device 11 exists in the vehicle compartment.

Further, for example, when a driver (occupant) touches a touch sensor of a door knob (neither of which is shown) of the vehicle V, a detection signal indicative of the touch is input from the touch sensor to the ECU 2, and a control input signal associated with the detection signal is input from the ECU 2 to the communication control circuit 10a. This causes the communication control circuit 10a to send a command signal requesting identification data for permission of unlocking of the doors to the portable device 11 via the antenna 10b.

On the other hand, as mentioned above, the portable device 11 is configured to execute transmission and reception of data to and from the on-vehicle communication device 10, and includes a case 11c, and a communication control unit 11a, an antenna 11b, etc., contained in the case 11c. The communication control unit 11a is implemented by a microcomputer comprising a CPU, a RAM, a ROM, and an I/O interface (none of which are shown).

When the portable device 11 receives a command signal from the on-vehicle communication device 10 via the antenna 11b, the communication control unit 11a sends a response signal to the command signal to the on-vehicle communication device 10 via the antenna 11b. For example, when the command signal from the on-vehicle communication device 10 is the above-mentioned confirmation signal, the response signal in the RF band indicative of existence of the portable device 11 in the vehicle compartment (hereinafter referred to as the "existence signal") is sent to the on-vehicle communication device 10.

Further, for example, when the command signal from the on-vehicle communication device 10 is one requesting transmission of the above-mentioned identification data for permission of unlocking of the doors, a response signal including the identification data for permission of unlocking of the doors is sent from the portable device 11 to the on-vehicle communication device 10. Then, upon receipt of the response signal, the on-vehicle communication device 10 delivers an electric signal including the identification data for permission of unlocking of the doors to the ECU 2. This causes the ECU 2 to determine whether or not the identification data for permission of unlocking of the doors, in the electric signal input from the on-vehicle communication device 10, is valid, and if it is determined that the identification data is valid, the ECU 2 drives the automatic lock mechanism to unlock all of the doors.

Further, when the command signal from the on-vehicle communication device 10 is one requesting transmission of a response signal including identification data for permission of operation of the engine 3, a response signal thereto is sent from the portable device 11 to the on-vehicle communication device 10. Then, upon receipt of the response signal from the portable device 11, the on-vehicle communication device 10 delivers an electric signal including the identification data for permission of operation of the engine 3 to the ECU 2. This cause the ECU 2 to determine whether or not the identification data in the electric signal input from the on-vehicle communication device 10 is for permitting operation of the engine 3, and if it is determined that the received identification data is for permitting operation of the engine 3, electric power from the battery 4 is made suppliable to each device of the engine 3, whereby the operating state of the engine 3 is controlled based on an operated state of a changeover switch 22, referred to hereinafter.

On the other hand, a shift position sensor 21 and the changeover switch 22 are electrically connected to the ECU 2. The shift position sensor 21 detects a shift position of an automatic transmission 6, and outputs a detection signal indicative of the detected shift position to the ECU 2. In this vehicle V, as the shift positions of the automatic transmission 6, there are set the five positions of "P (parking)", "N", "R", "D", and "S", and a shift position currently selected is displayed on a meter panel (not shown) in the vehicle compartment during the operation of the engine 3.

Further, the changeover switch 22 is of a push-button switch type for switching a power source position, and is disposed on a dashboard on the driver's sheet side of the vehicle V. The changeover switch 22 detects an operation for switching the power source position by the driver, and outputs the detection result to the ECU 2. In this case, whenever the driver presses the changeover switch 22 once, the power source position is sequentially switched to "off position", "accessory position", "on position", "off position", . . . , in the mentioned order, and the switched power source position is stored in a RAM of the ECU 2 as data.

Further, switching from the "on position" to the "off position" is executed only when a predetermined switching condition (e.g. a condition that the vehicle speed is close to 0) is satisfied in a case where the changeover switch 22 is pressed. Note that in the following description, the "off position" is referred to as "the OFF position", the "accessory position" is referred to as "the ACC position", and the "on position" is referred to as "the ON position".

Further, when the power source position selected by the driver is in the OFF position, the engine 3 is stopped by the ECU 2, whereas when the power source position selected by the driver is in the ACC position, the engine 3 is held at a stopped state by the ECU 2 and electric power from the battery 4 is supplied to the car nav 5. Further, when the power source position is switched from the ACC position to the ON position, electric power from the battery 4 is supplied to all electric devices mounted on the vehicle V, and control for starting the engine 3 is executed by the ECU 2 until the engine 3 is started.

On the other hand, the ECU 2 is implemented by a microcomputer comprising a CPU, a RAM, a ROM, and an I/O interface (none of which are shown), and executes various control processes, such as an ACC-time power control process, based on detection signals from the various sensors 20 and 21 and the output signal from the above-mentioned changeover switch 22. Note that in the present embodiment, the ECU 2 corresponds to control means and power source position-detecting means.

Hereafter, the ACC-time power control process executed by the ECU 2 will be described with reference to FIG. 2. This control process is executed for controlling a state of supply of electric power from the battery 4 to the car nav 5 when the power source position is in the ACC position, and is executed at a predetermined control period $\Delta T$ (e.g. 10 msec). Note that various values calculated in the following description are stored in the RAM in the ECU 2.

Figure 2:
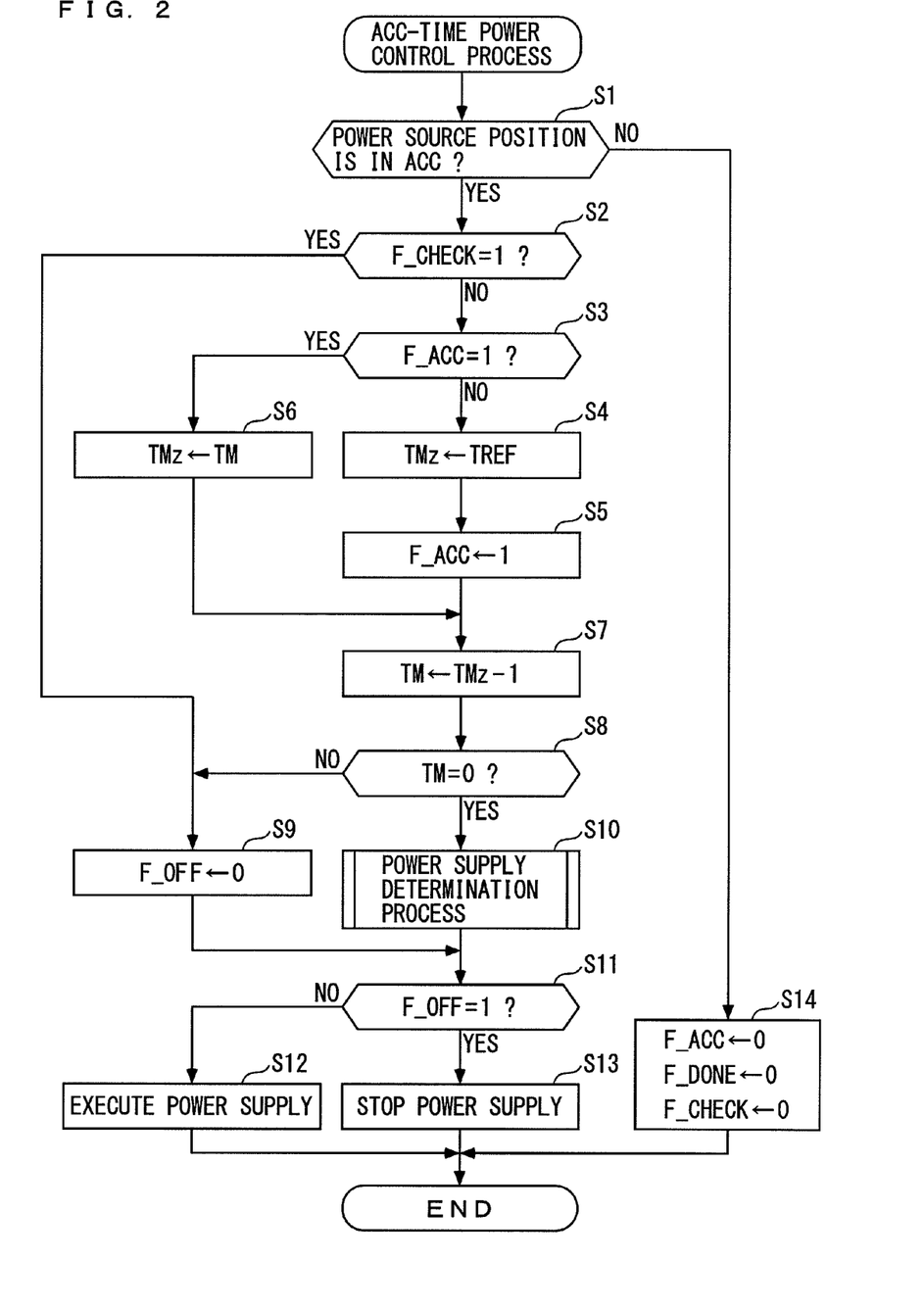
FIG. 2 A flowchart of an ACC-time power control process.

As shown in FIG. 2, in this control process, first, in a step 1 (shown as S1 in abbreviated form in FIG. 2; the following steps are also shown in abbreviated form), it is determined whether or not the power source position stored in the RAM is the ACC position. If the answer to the question of the step 1 is negative (NO), the process proceeds to a step 14, wherein three flags F_ACC, F_DONE, and F_CHECK, referred to hereinafter, are all set to 0, followed by terminating the present process.

On the other hand, if the answer to the question of the step 1 is affirmative (YES), i.e. if the power source position is the ACC position, the process proceeds to a step 2, wherein it is determined whether or not the determination in-execution flag F_CHECK is equal to 1. The determination in-execution flag F_CHECK indicates whether or not a portable device existence determination process, described hereinafter, is being executed. If the answer to the question of the step 2 is affirmative (YES), i.e. if the portable device existence determination process is being executed, the process proceeds to a step 9, wherein a power supply stop flag F_OFF is set to 0.

On the other hand, if the answer to the question of the step 2 is negative (NO), i.e. if the portable device existence determination process is not being executed, the process proceeds to a step 3, wherein it is determined whether or not the ACC control in-execution flag F_ACC is equal to 1. If the present control time is immediately after the power source position is switched to the ACC position, the answer to the question of the step 3 is negative (NO), and in this case, the process proceeds to a step 4, wherein the immediately preceding value TMz of a count value counted by a power supply timer is set to a predetermined value TREF. The power supply timer is used for counting duration of power supply from the battery 4 to the car nav 5.

Next, the process proceeds to a step 5, wherein the ACC control in-execution flag F_ACC is set to 1 so as to indicate that the ACC-time power control process is being executed. By thus setting the ACC control in-execution flag F_ACC to 1, the answer to the question of the step 3 becomes affirmative (YES) in the next and subsequent control times, and in this case, the process proceeds to a step 6, wherein the immediately preceding value TMz of the count value of the power supply timer is set to the count value TM of the power supply timer stored in the RAM.

In a step 7 following the step 5 or 6, the count value TM of the power supply timer is set to a value of TMz−1 obtained by subtracting 1 from the immediately preceding value TMz. That is, the count value TM of the power supply timer is decremented by 1.

Next, the process proceeds to a step 8, wherein it is determined whether or not the count value TM of the power supply timer is equal to 0. If the answer to the question of the step 8 is negative (NO), the process proceeds to the step 9, wherein the power supply stop flag F_OFF is set to 0.

On the other hand, if the answer to the question of the step 8 is affirmative (YES), i.e. if a time period corresponding to a value of ΔT·TREF has elapsed after switching of the power source position to the ACC position, the process proceeds to a step 10, wherein a power supply determination process is executed. This determination process is for determining whether or not to execute power supply from the battery 4 to the car nav 5, and more specifically, the process is executed as shown in FIG. 3.

Figure 3:
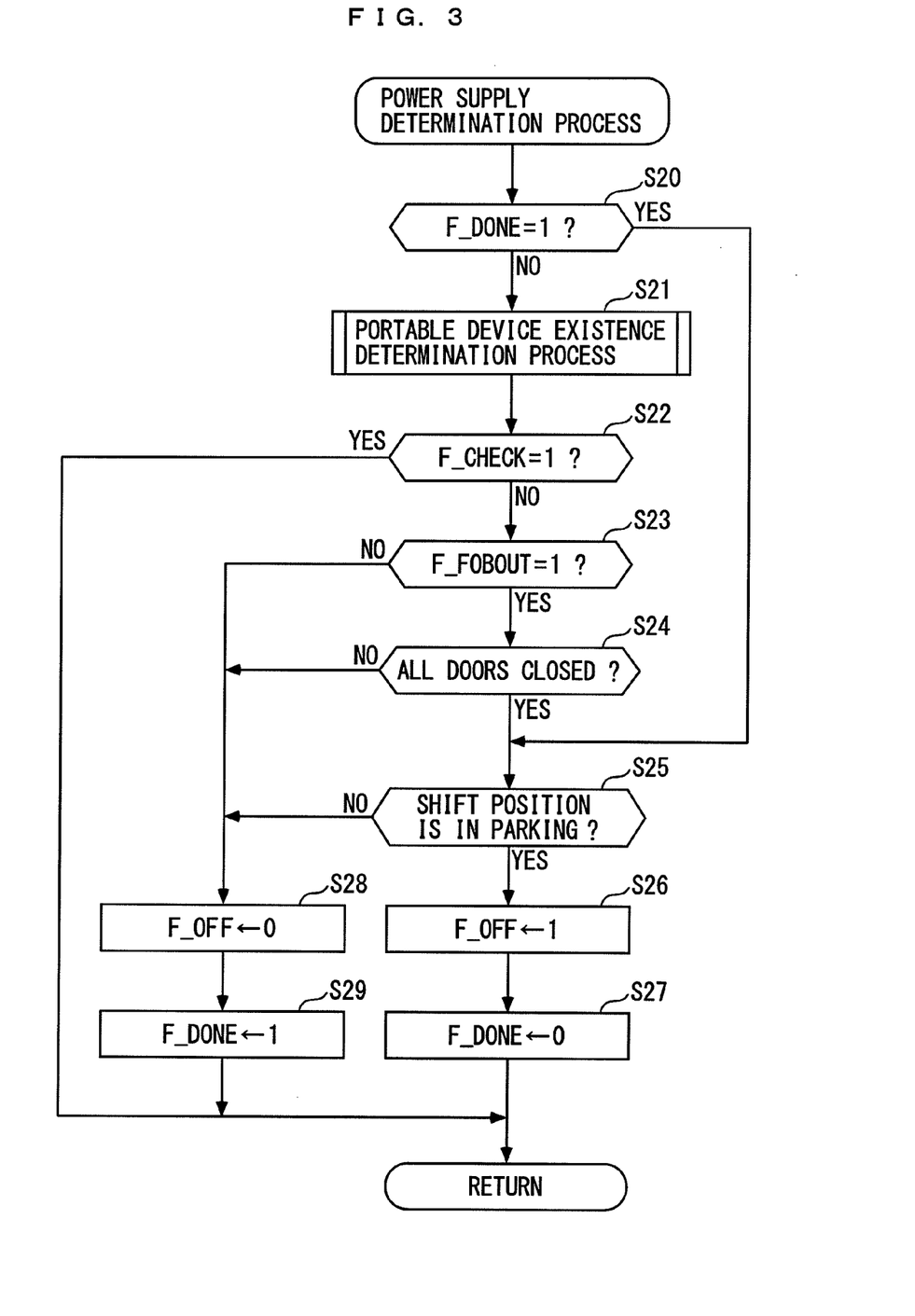
FIG. 3 A flowchart of a power supply determination process.

As shown in FIG. 3, first, in a step 20, it is determined whether or not the determined flag F_DONE is equal to 1. The determined flag F_DONE indicates whether or not the power supply determination process has been executed once or more after switching of the power source position to the ACC position, and the value of the determined flag F_DONE is set as described hereafter.

If the answer to the question of the step 20 is negative (NO), i.e. if the present process is executed for the first time after switching of the power source position to the ACC position, the process proceeds to a step 21, wherein the portable device existence determination process is executed. The portable device existence determination process is for determining whether or not the portable device 11 is in the vehicle compartment, and more specifically, the process is executed as shown in FIG. 4.

Figure 4:
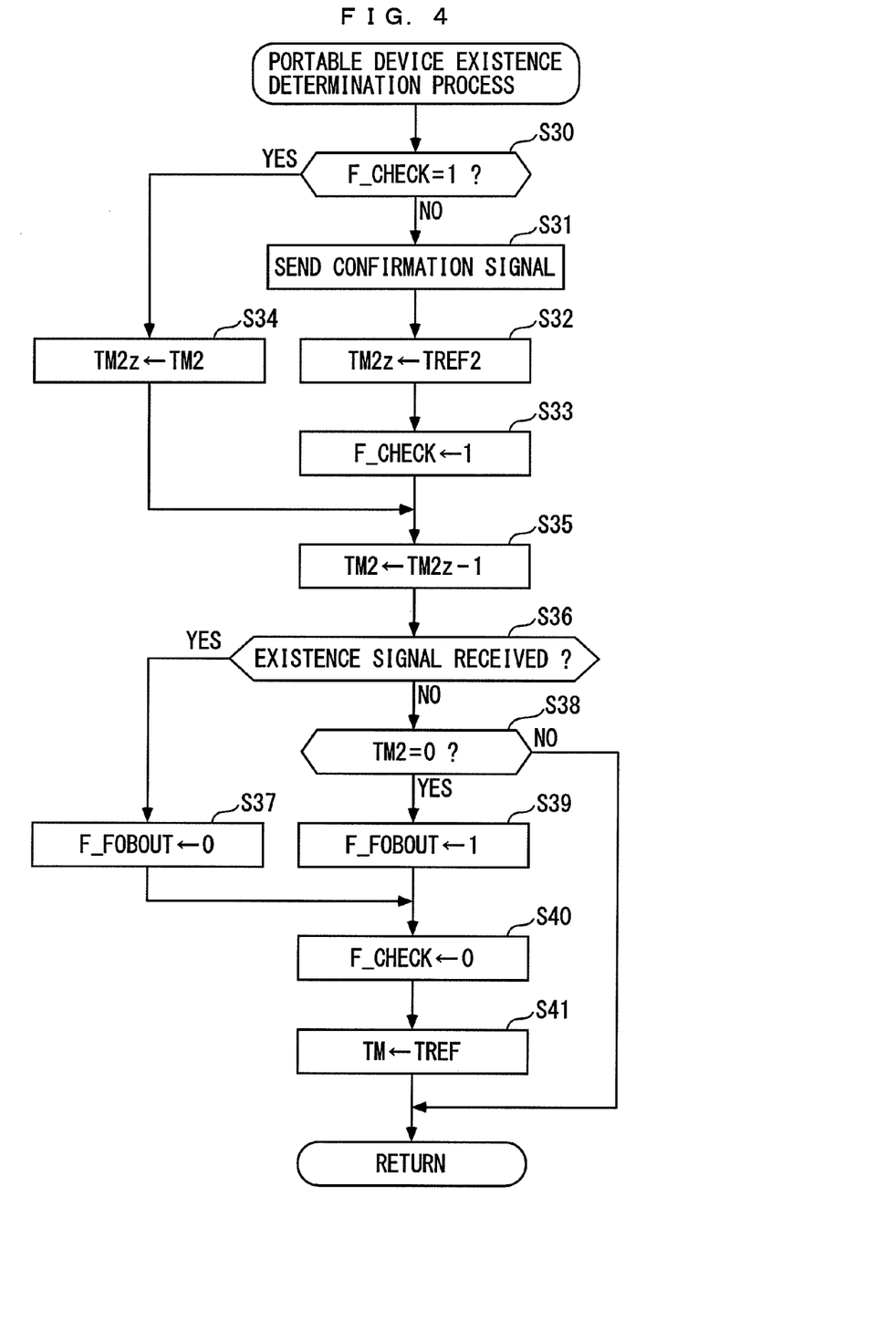
FIG. 4 A flowchart of a portable device existence determination process.

As shown in FIG. 4, first, in a step 30, it is determined whether or not the determination in-execution flag F_CHECK is equal to 1. The determination in-execution flag F_CHECK indicates whether or not the portable device existence determination process is being executed, and the value of the determination in-execution flag F_CHECK is set as described hereafter.

If the answer to the question of the step 30 is negative (NO), it is determined that the portable device existence determination process is to be executed, the process proceeds to a step 31, wherein a control input signal for checking whether or not the portable device 11 is in the vehicle compartment is supplied to the on-vehicle communication device 10, and the above-mentioned confirmation signal is sent from the on-vehicle communication device 10 to the portable device 11.

Next, the process proceeds to a step 32, wherein the immediately preceding value TM2z of the count time of a determination holding timer is set to a predetermined value TREF2. In a step 33 following the step 32, to indicate that the portable device existence determination process is being executed, the determination in-execution flag F_CHECK is set to 1.

By thus setting the determination in-execution flag F_CHECK to 1, the answer to the question of the step 30 becomes affirmative (YES) in the next and subsequent control times, and in this case, the process proceeds to a step 34, wherein the immediately preceding value TM2z of the count time of the determination holding timer is set to the count value TM2 of the determination holding timer stored in the RAM.

In a step 35 following the step 33 or 34, the count value TM2 of the determination holding timer is set to a value of TM2-1 obtained by subtracting 1 from the immediately preceding value TM2. That is, the count value TM2 of the determination holding timer is decremented by 1.

Next, the process proceeds to a step 36, wherein it is determined whether or not the above-mentioned existence signal has been received by the on-vehicle communication device 10. If the answer to the question of the step 36 is affirmative (YES), i.e. if the existence signal has been received, it is determined that the portable device 11 is in the vehicle compartment, so that the process proceeds to a step 37, wherein to indicate this fact, a portable device absence flag F_FOBOUT is set to 0.

On the other hand, if the answer to the question of the step 36 is negative (NO), i.e. if the existence signal has not been received, the process proceeds to a step 38, wherein it is determined whether or not the count value TM2 of the determination holding timer is equal to 0. If the answer to the question of the step 38 is negative (NO), the present process is immediately terminated.

On the other hand, if the answer to the question of the step 38 is affirmative (YES), i.e. if the duration of a state in which the existence signal is not received after sending the confirmation signal to the portable device 11 becomes equal to a value of ΔT·TREF2, it is determined that the portable device 11 is not in the vehicle compartment, and the process proceeds to a step 39, wherein to indicate this fact, the portable device absence flag F_FOBOUT is set to 1.

In a step 40 following the step 37 or 39, the determination in-execution flag F_CHECK is set to 0. Then, in a step 41, the count value TM of the above-mentioned power supply timer is set to the predetermined value TREF, followed by terminating the present process. Note that in the present embodiment, as described above, the fact that after transmitting the confirmation signal from the on-vehicle communication device 10 to the portable device 11, the existence signal could be received from the portable device 11 by the on-vehicle communication device 10 corresponds to establishment of a predetermined communication state between the portable device 11 and the on-vehicle communication device 10.

Referring again to FIG. 3, in the step 21, the portable device existence determination process is executed as described above, and then the process proceeds to a step 22, wherein it is determined whether or not the determination in-execution flag F_CHECK is equal to 1. If the answer to the question of the step 22 is affirmative (YES), i.e. if the portable device existence determination process is being executed, the present process is immediately terminated.

On the other hand, if the answer to the question of the step 22 is negative (NO), i.e. if the portable device existence determination process has been executed, the process proceeds to a step 23, wherein it is determined whether or not the above-mentioned portable device absence flag F_FOBOUT is equal to 1. If the answer to the question of the step 23 is affirmative (YES), i.e. if the portable device 11 is not in the vehicle compartment, the process proceeds to a step 24, wherein it is determined based on the detection signals from the five door sensors 20 whether or not all of the doors are in the closed state. If the answer to the question of the step 24 is affirmative (YES), i.e. if all of the doors are in the closed state, the process proceeds to a step 25, wherein it is determined based on the detection signal from the shift position sensor 21 whether or not the shift position is in the parking position.

If the answer to the question of the step 25 is affirmative (YES), it is determined that power supply from the battery 4 to the car nav 5 is to be stopped, and the process proceeds to a step 26, wherein to indicate this fact, the power supply stop flag F_OFF is set to 1. Next, in a step 27, the determined flag F_DONE is set to 0, followed by terminating the present process.

On the other hand, if any one of the answers to the questions of the steps 23 to 25 is negative (NO), i.e. if the portable device 11 is in the vehicle compartment, or if one or more doors are in the opened state, or if the shift position is in a position other than the parking position, it is determined that power supply from the battery 4 to the car nav 5 is to be executed, and the process proceeds to a step 28, wherein to indicate this fact, the power supply stop flag F_OFF is set to 0.

Next, in a step 29, the determined flag F_DONE is set to 1, followed by terminating the present process. By thus setting the determined flag F_DONE to 1 in the step 29, the answer to the above-mentioned step 20 becomes affirmative (YES) in the next and subsequent control times, and in this case, the step 25 et seq. are executed as described above, followed by terminating the present process.

Referring again to FIG. 2, in the step 10, the power supply determination process is executed as described above. In a step 11 following the step 9 or 10, it is determined whether or not the power supply stop flag F_OFF is equal to 1. If the answer to the question of the step 11 is negative (NO), in a step 12, a control input signal for executing power supply from the battery 4 to the car nav 5 is supplied to the power supply control circuit 12, whereby power supply from the battery 4 to the car nav 5 is executed, followed by terminating the present process. At this time, the ECU 2 holds the power source position stored in the RAM in the ACC position.

On the other hand, if the answer to the question of the step 11 is affirmative (YES), the process proceeds to a step 13, wherein a control input signal for stopping power supply from the battery 4 to the car nav 5 is supplied to the power supply control circuit 12, whereby power supply from the battery 4 to the car nav 5 is stopped, followed by terminating the present process. At this time, the ECU 2 switches the power source position stored in the RAM from the ACC position to the OFF position.

As described above, according to the control system 1 of the present embodiment, when the power source position is switched to the ACC position, electric power from the battery 4 is supplied to the car nav 5 until a time period corresponding to the value of $\Delta T \cdot TREF$ elapses after the time point of the switching. Then, when the time period corresponding to the value of $\Delta T \cdot TREF$ has elapsed, it is estimated whether or not the portable device 11 is in the vehicle compartment (step 21), and if it is estimated that the portable device 11 is in the vehicle compartment (if the answer to the question of the step 23 is negative (NO)), power supply from the battery 4 to the car nav 5 is continued until the time period corresponding to the value of $\Delta T \cdot TREF$ elapses again from the time point, and hence the car nav 5 can be used during the continuation of power supply, which improves the convenience of the driver.

Further, in a case where the time period corresponding to the value of $\Delta T \cdot TREF$ has elapsed again from the time at which it was estimated that the portable device 11 is in the vehicle compartment (if the answer to the question of the step 20 is affirmative (YES)), when the shift position is in the parking position (if the answer to the question of the step 25 is affirmative (YES)), power supply from the battery 4 to the car nav 5 is stopped. This makes it possible to suppress increase in power consumption and reduce the running cost. For the same reason, it is possible to prevent the battery 4 from being overdischarged, which makes it possible to prolong the life of the battery 4.

Further, even in a case where it is estimated that the portable device 11 is not in the vehicle compartment at a time when the time period corresponding to the value of $\Delta T \cdot TREF$ elapses after the time point that the power source position was switched to the ACC position, if any one of the doors is in the opened state (if the answer to the question of the step 23 is affirmative (YES) and if the answer to the question of the step 24 is negative (NO)), i.e. when it is estimated that the portable device 11 is not in the vehicle compartment but it is estimated that the driver is near the vehicle V because the door is in the opened state, power supply from the battery 4 to the car nav 5 is continued until the time period corresponding to the value of $\Delta T \cdot TREF$ elapses again, and hence it is possible to further improve the convenience of the driver.

Further, in a case where the time period corresponding to the value of $\Delta T \cdot TREF$ elapses again from the time point that it was estimated that the driver was near the vehicle V (if the answer to the question of the step 20 is affirmative (YES)), when the shift position is in the parking position (if the answer to the question of the step 25 is affirmative (YES)), power supply from the battery 4 to the car nav 5 is stopped. This makes it possible to further suppress increase in power consumption and further reduce the running cost.

In addition to this, even in a case where it is estimated that the portable device 11 is not in the vehicle compartment and also all of the doors are in the closed state (if both of the answers to the questions of the steps 23 and 24 are affirmative (YES)), at a time when the time period corresponding to the value of $\Delta T \cdot TREF$ elapses after the time point that the power source position was switched to the ACC position, when the shift position is in a position other than the parking position (if the answer to the question of the step 25 is negative (NO)), the power source position is held at the ACC position, and power supply from the battery 4 to the car nav 5 is continued. By continuing the power supply, when the driver who does not carry the portable device 11 attempts to go out of the vehicle, a warning sound is generated by a buzzer, which makes it possible to notify the driver that the shift position is in a position other than the parking position, and thereby improve marketability.

Although in the above-described embodiment, the internal combustion engine 3 is used as the motive power source, the motive power source of the present invention is not limited to this, but any other motive power source may be employed insofar as it is mounted on the vehicle. For example, as the motive power source, an electric motor may be used, or both of an electric motor and the internal combustion engine may be employed.

Further, although the changeover switch 22 of the push-button switch type is used as the power source position-switching device, by way of example, the power source position-switching device of the present invention is not limited to this, but any other device may be employed insofar as the power source position can be switched by a driver. For example, as the power source position-switching device, there may be employed a key switch that switches the power source position according to an operation of the ignition key by a driver, a touch panel-type device that switches the power source position according to a touch operation by a driver, or a voice input-type device that switches the power source position according to a voice command from a driver.

Further, although the present embodiment is an example in which a combination of the changeover switch 22 and the ECU 2 is used as the power source position-detecting means, the power source position-detecting means of the present invention is not limited to this, but any other device may be employed insofar as it detects the power source position of the power source position-switching device. For example, as the power source position-detecting means, there may be employed a key switch that outputs a signal corresponding to the power source position which is switched according to the operation of the ignition key by a driver, a touch panel-type device that outputs a signal corresponding to the power source position which is switched according to a touch operation by a driver, or a voice input-type device that outputs a signal corresponding to the power source position which is switched according to a voice command from a driver. Further, any of these devices and an electric circuit may be used in combination.

Further, although the present embodiment is an example in which the door sensor 20 is used as door opened/closed state-detecting means, the door open/close state-detecting means of the present invention is not limited to this, but any other device may be employed insofar as it can detect the opened/closed state of the door of the vehicle. For example, as the door opened/closed state-detecting means, there may be employed a switch that outputs an ON/OFF signal according to opening/closing of the door.

Further, although the present embodiment is an example in which the shift position sensor 21 is used as shift position-detecting means, the shift position-detecting means of the present invention is not limited to this, but any other device may be employed insofar as it can detect the shift position of the automatic transmission. For example, as the shift position-detecting means, there may be employed a switch that outputs a plurality of types of signals corresponding to a plurality of shift positions.

On the other hand, although the present embodiment is an example in which the car navigation system 5 is used as the on-vehicle electric device, the on-vehicle electric device of the present invention is not limited to this, but any other device may be employed insofar as it is a device to which electric power from the power source is supplied when the power source position is in the accessory position. For example, as the on-vehicle electric device, there may be employed an on-vehicle audio unit or an on-vehicle television unit.

Further, although the present embodiment is an example in which the battery 4 of the lead acid battery type is used as the power source, the power source of the present invention is not limited to this, but any other power source may be employed insofar as it can supply electric power to the on-vehicle electric device. For example, as the power source, there may be employed a super capacitor or a lithium ion battery.

Further, although the present embodiment is an example in which the fact that after transmitting a command signal in the LF band from the on-vehicle communication device 10 to the portable device 11, a response signal in the RF band from the portable device 11 could be received by the on-vehicle communication device 10 is used as a state of establishment of a predetermined communication state between the portable device and the on-vehicle communication device, the state in which the predetermined communication state is established in the present invention is not limited to this, but any other state may be employed insofar as the state makes it possible to estimate that the portable device is in the compartment of the vehicle. For example, establishment of Bluetooth (registered trademark) communication between the portable device and the on-vehicle communication device may be used as the state in which the predetermined communication state is established.

Further, although the present embodiment is an example in which the same value $\Delta T \cdot TREF$ is used as the first to third predetermined time periods, different values from each other may be used as the first to third predetermined time periods.

Further, although the present embodiment is an example in which the portable device existence determination process is executed in timing that the time period corresponding to the value of $\Delta T \cdot TREF$ elapses after the time point that the power source position was switched to the ACC position, the start timing of the portable device existence determination process may be advanced and the termination timing of the portable device existence determination process may be the same time as the timing at which the time period corresponding to the value of $\Delta T \cdot TREF$ elapses after the time point that the power source position was switched to the ACC position, or may be immediately before the time period corresponding to the value of $\Delta T \cdot TREF$ elapses.

INDUSTRIAL APPLICABILITY

As described above, the control system for a vehicle of the present invention is effective in suppressing increase in power consumption and reducing the running cost in a case where electric power supplied from a power source is consumed by an on-vehicle electric device.

REFERENCE SIGNS LIST

V vehicle
1 control system
2 ECU (control means, power source position-detecting means)
3 internal combustion engine (motive power source)
4 battery (power source)
5 car navigation system (on-vehicle electric device)
6 automatic transmission
10 on-vehicle communication device
11 portable device 20 door sensors (door opened/closed state-detecting means)
21 shift position sensor (shift position-detecting means)
22 changeover switch (power source position-switching device, power source position-detecting means)

The invention claimed is:

1. A control system for a vehicle that has a motive power source mounted thereon and has the motive power source enabled by wireless communication between a portable device and an on-vehicle communication device to operate, the control system controlling a state of power supply from a power source to the motive power source and an on-vehicle electric device according to the switching of a power source position of a power source position-switching device by an occupant, comprising:

power source position-detecting means for detecting the power source position; and control means for controlling electric power from the power source such that the electric power is supplied to the on-vehicle electric device, when the detected power source position is in an accessory position in which the electric power from the power source is to be supplied to the on-vehicle electric device, wherein in a case where a predetermined communication state between the on-vehicle communication device and the portable device is established in which the portable device is estimated to be in a compartment of the vehicle after a state in which the power source position is in the accessory position has continued for a first predetermined time period, said control means stops power supply from the power source to the on-vehicle electric device when a second predetermined time period elapses after a time at which the predetermined communication state is established.

2. The control system according to claim 1, further comprising door opened/closed state-detecting means for detecting an opened/closed state of doors of the vehicle, and wherein based on a detection result from said door opened/closed state-detecting means, in a case where a condition that the predetermined communication state is not established and also the doors are in the opened state is satisfied after the state in which the power source position is in the accessory position has continued for the first predetermined time period, said control means stops the power supply from the power source to the on-vehicle electric device, when a third predetermined time period elapses after a time at which the condition is satisfied.

3. The control system according to claim 2, further comprising shift position-detecting means for detecting a shift position of an automatic transmission of the vehicle, and wherein based on detection results from said shift position-detecting means and said door opened/closed state-detecting means, in a case where the predetermined communication state is not established and also the doors are in the closed state, after the state in which the power source position is in the accessory position has continued for the first predetermined time period, said control means continues, when the shift position is in a position other than a parking position, the power supply from the power source to the on-vehicle electric device.

* * * * *